July 18, 1944.　　　　E. STERNBERG　　　　2,354,155

OUTLET DEVICE FOR AIR CONDITIONING SYSTEMS

Filed Dec. 29, 1941　　　3 Sheets-Sheet 1

INVENTOR.
EDWIN STERNBERG
BY Edwin Leisohn
ATTORNEY.

July 18, 1944. E. STERNBERG 2,354,155
OUTLET DEVICE FOR AIR CONDITIONING SYSTEMS
Filed Dec. 29, 1941 3 Sheets-Sheet 2

INVENTOR.
EDWIN STERNBERG
BY Edwin Levisohn
ATTORNEY.

July 18, 1944.  E. STERNBERG  2,354,155
OUTLET DEVICE FOR AIR CONDITIONING SYSTEMS
Filed Dec. 29, 1941  3 Sheets-Sheet 3
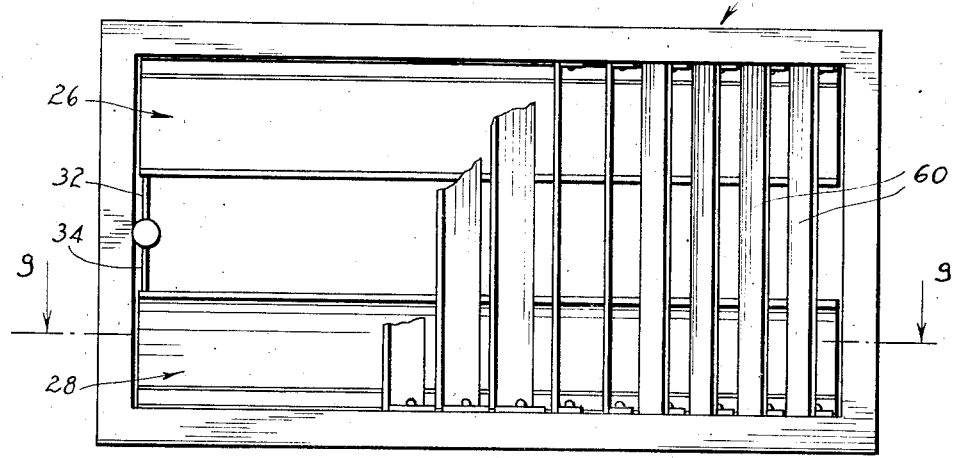
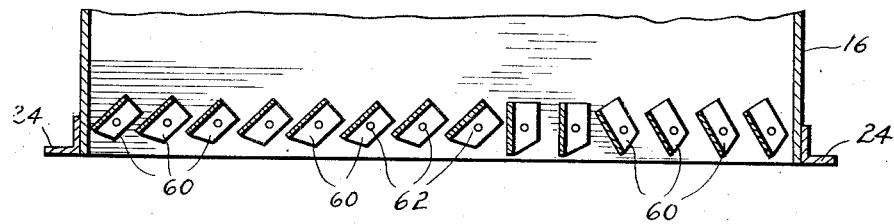
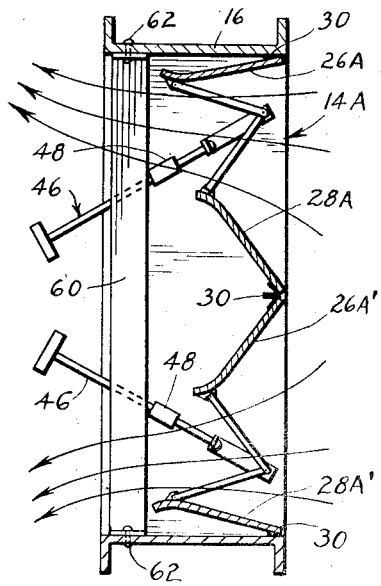
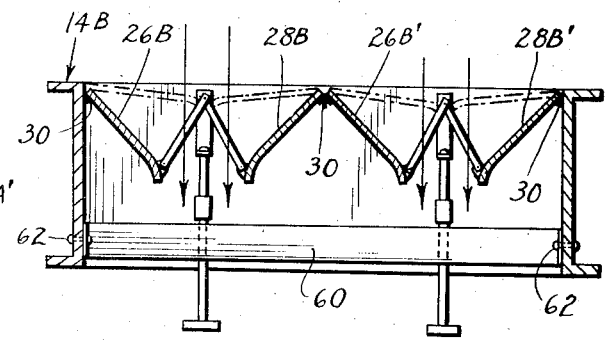
INVENTOR.
EDWIN STERNBERG
BY
ATTORNEY Patented July 18, 1944

2,354,155

UNITED STATES PATENT OFFICE 2,354,155

OUTLET DEVICE FOR AIR-CONDITIONING SYSTEMS

Edwin Sternberg, New York, N. Y.

Application December 29, 1941, Serial No. 424,688

5 Claims. (Cl. 98—40)

This invention relates to air conditioning and ventilating systems and more particularly to the outlets for the air ducts of these systems. The outlets of the present invention are especially useful in connection with the distribution of comparatively dry air to the holds of freight ships to prevent condensation of moisture on the cargo and on the interior of the ship. It may be used with advantage in commercial and industrial air conditioning systems, ventilating systems and warm air heating systems.

A known air conditioning system for cargo holds on ships, comprises a centrally located air drying plant usually amidships near the engine room, from which plant very dry air is pumped through steel pipes running the length of the ship to individual air circulating systems located at each cargo hold. These individual systems (briefly described) consist of a motor driven fan which is connected on its intake side to the cargo hold or to the atmosphere whichever is desired by means of a damper or valve arrangement. The discharge side of the fan is connected to a supply duct distribution system to distribute the air properly in each level of the cargo hold. Each system can be operated either with air recirculated from each hold and with additional dry air supplied from the central system or can be operated entirely with outdoor air, as determined by atmospheric conditions, nature of cargo, etc. An exhaust system is provided to facilitate the air circulation and to discharge the air from the holds when 100% atmospheric air is used. This exhaust system is usually located at the opposite end of the hold from the supply system.

The air mixture is distributed throughout the cargo hold by means of steel-plate ducts in which are located rectangular outlet openings protected by ordinary wire mesh screen. Each opening, for proper operation, requires its own damper for regulating the air supply and, in most cases, deflecting vanes to turn the air flow and distribute the air uniformly over the wire opening area.

The size of these cargo holds varies, depending on the ship design and the location of the hold. Therefore, the distance which the air must travel to accomplish the desired results also varies. In addition, the hull which forms the outer walls of the hold is usually of a curved shape; the degree of curvature depending on the location in the vessel. It is, therefore, of great importance that the air supplied be introduced at ample speed or velocity to distribute properly over the length of the hold and be directed to achieve this result without interference. The present type of outlet, although it introduces the air in desired volume does not direct the air as required or regulate its velocity for maximum efficiency.

The primary object of the present invention, therefore, is to provide a flexible means of regulating the quantity of air and the velocity of the flow thereof and to cause the air to flow properly in the desired direction, all as required for any individual condition of the hold of the ship. This object of the invention and other objects ancillary thereto are accomplished, in accordance with the preferred embodiment of the invention, by the provision of an adjustable outlet device which is constructed and arranged to accomplish the following functions:

(a) To vary the air volume from zero to the maximum capacity of the outlet by means of an adjustable nozzle located inside the device. This nozzle preferably consists of two curved blades of proper design to vary the effective area and produce an efficient air discharge. The adjustment of the nozzle is accomplished by means of a conveniently located mechanism to regulate the nozzle in a range of adjustment from wide-open to tight-closed conditions.

(b) To vary the direction of the air stream in a vertical plane; i. e., up or down, by changing the relative position of the adjustable nozzle blades. This varied direction can be accomplished in any nozzle position as explained in paragraph "a" by means of the same adjusting mechanism. The nozzle shape is retained by the device in any of the adjusted positions thereof.

(c) To vary the air stream in a horizontal plane by means of front adjustable blades. These blades permit the air stream to be directed as conditions require. This feature is of great importance due to the ship design with its many curved surfaces as explained above.

(d) The front adjustable blades provide means for obtaining uniform distribution of air across the face of the entire outlet. They prevent the air crowding through any portion of the outlet due to the change in direction of air flow or outlet location.

(e) The distance the air must be blown is an important feature of proper air distribution. This device permits selection of the correct velocity to accomplish the desired air "blow" to insure an even distribution over the entire hold.

In accordance with a further object of the invention, the adjustable outlet device having the above described functions is constructed and arranged to replace the individual, heavy, butterfly type of air damper with its bearings and regulator located in the branch duct connected to each outlet, the wire mesh screen which must be made in an individual frame and bolted or otherwise secured to the duct wall, and the vanes or deflectors provided for the purpose of distributing the air over the face of the wire screen. Since it is necessary to make up all of these parts individually at the shipyard in the required sizes and in the shape required for the particular duct, considerable engineering, shop and erection labor are required. These and other disadvantages are eliminated by the adjustable outlet device of the present invention for the reason that said device can be easily manufactured and produced in a complete single unit, ready for mounting in position on the wall of the duct.

A further object of the invention is to make possible simplification of the design and construction of the air duct. In the above described system, individual duct branches or take-offs for the installation of the above mentioned damper and deflecting vanes are required and the branch duct must be carefully fabricated and connected to the main duct, the connections usually accomplished by welding. These disadvantages and objections are eliminated by the present invention by reason of the fact that the adjustable outlet device embodying the same is constructed and arranged to be mounted directly on the wall of the main duct.

A yet further object of the invention is generally to provide an air distributing system with air outlet devices which are simple in construction and are less expensive to manufacture and to install, requiring less material, less shop labor and less erection labor in comparison with the air outlets and the related ducts in the above described system. A duct system provided with the outlet devices of the present invention can be designed for higher velocities of air flow, thereby resulting in smaller and lighter ducts, in increased space and head room available for cargo in the holds of the ships, and in less interference with other piping, structural conditions, etc., on the ship.

The present preferred embodiment of the invention will now be described with reference to the accompanying illustrative drawings.

In the drawings:

Fig. 8 is a front view of the adjustable outlet device, with parts removed for the purpose of illustration;

Fig. 9 is a sectional view on the line 9—9 of Fig. 8;

Fig. 10 is a vertical sectional view of an outlet device showing another form of the present invention;

Fig. 11 is a horizontal sectional view of an outlet device of the present invention of a form similar to that shown in Fig. 10.

Figure 1:
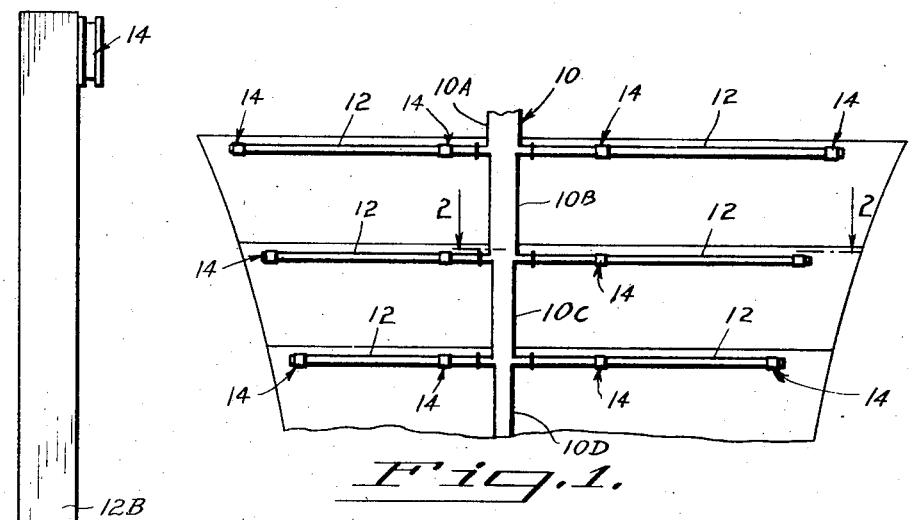
Fig. 1 is a more or less diagrammatic transverse sectional view of part of the hold of a ship provided with air ducts equipped with the adjustable air outlet devices of the present invention.
Figure 3:
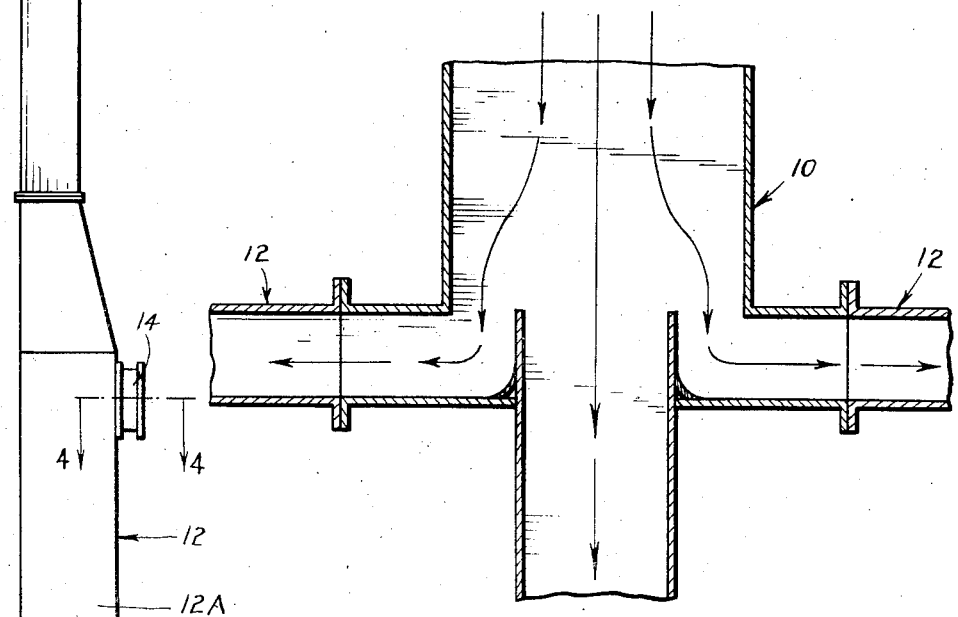
Fig. 3 is a sectional view, on a larger scale, on the line 3—3 of Fig. 2.
Figure 2:
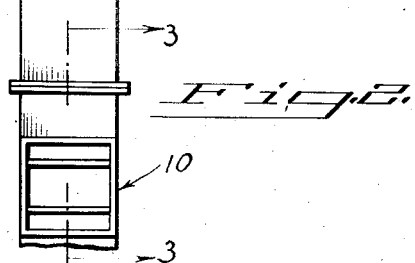
Fig. 2 is a plan view of an air duct equipped with outlet devices of the present invention, said view being taken on a larger scale along the line 2—2 of Fig. 1.
Figure 4:
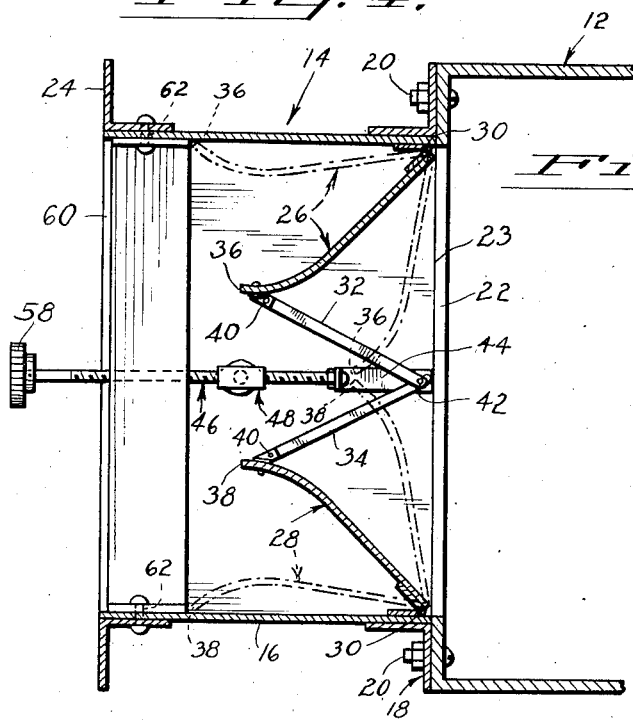
Fig. 4 is a sectional view of the outlet device, on the line 4—4 of Fig. 2.
Figure 6:
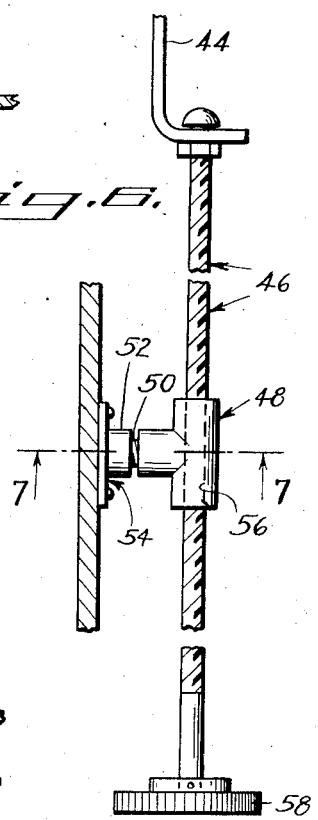
Fig. 6 is a view of the adjusting mechanism.
Figure 5:
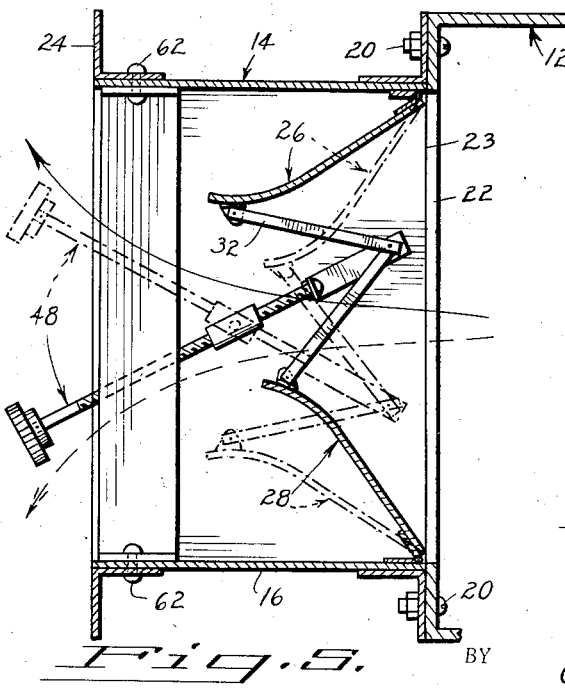
Fig. 5 is a view similar to Fig. 4 but showing a different adjustment of the device.
Figure 7:
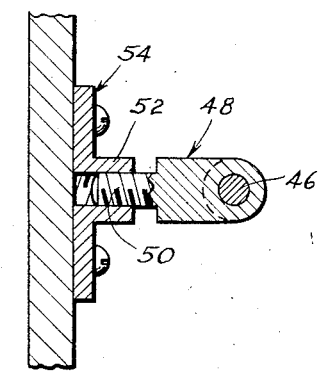
Fig. 7 is a sectional view on the line 7—7 of Fig. 6.

Referring now to the drawings in further detail, the present invention is illustrated, as indicated by Fig. 1, in connection with the hold of a ship. The conditioned or outside air is supplied to the vertical duct 10 by a supply fan or blower (not shown) and has connected thereto at the levels of the different decks of the hold transversely extending branch ducts 12 each provided with one or more outlet devices 14 embodying the present invention. As here shown vertical duct 10 has a plurality of sections 10a, 10b, 10c, 10d, etc., of decreasing cross sectional area, respectively, in accordance with the quantity of air which said sections are required to carry, whereby to maintain the desired air distribution in each section of said duct 10. Similarly, each branch duct 12 has sections 12a and 12b of different cross sectional area in accordance with the quantity of air flowing in said sections whereby to maintain the desired air pressure at the outlets 14 connected thereto, respectively. The above arrangement is diagrammatic of one type of air duct distribution. Other arrangements of the main air supply duct 10b, 10c, 10d can be designed to carry the air supply to the various decks, but in each case outlet devices embodying the present invention are provided at each deck.

Considering now the construction of the adjustable outlet 14, reference being had more particularly to Figs. 4 to 9, inclusive, it is seen that said outlet devices comprise a rectangular casing 16 having a rear peripheral flange 18 fixed thereto or integral therewith and secured to duct 12 preferably by means of bolts 20. Casing 16 communicates with duct 12 through an opening 22 provided in said duct, said opening being of substantially the same size and shape as the inlet opening 23 in casing 16. The forward end of casing 16 has fixed thereto or integral therewith a peripheral reinforcing flange 24. Suitable additional wire screen or other protective material can be fastened to front flange 24 if desired. Flange 24 may be omitted if desired by increasing the thickness of casing 16.

The flow of air from the adjacent section of duct 12 through the outlet device 14 is controlled by an adjustable nozzle device constituted as here shown by a pair of vanes 26 and 28, each of which extends longitudinally of casing 16 for the full length thereof. Vanes 26 and 28 are pivotally connected to the adjacent side walls of the casing near the rear end of said casing by hinges or pivots 30. Each vane extends radially from its pivot toward the companion vane and terminates in a free end spaced radially from its own pivot. As illustrated, said vanes are preferably curved for the purpose of promoting better efficiency in the flow of the air. Vanes 26 and 28 are preferably connected to each other for conjoint operation by means of links 32 and 34 pivotally connected to said vanes adjacent their free edges 36 and 38, respectively, by means of hinges 40. Said links 32 and 34 are pivotally connected to each other at their adjacent ends by a pivot pin 42, and said pivotally connected ends of the links are pivotally connected by means of a link 44 to the rod 46 of an operating mechanism which will now be described. Rod 46 is mounted on casing 16 for longitudinal and pivotal movement and for this purpose said rod extends through a coupling member 48. Said coupling member has a laterally extending screw-threaded portion 50 which engages in an internally screw-threaded socket 52 of a supporting bracket 54 which is secured to an end wall of casing 16. The screw-threaded extension 50 of coupling 48 supports said coupling and permits the latter to turn as freely as may be desired in bracket 54. Rod 46 is in screw-threaded engagement with the internally threaded bore 56 of said coupling whereby rotation of said rod results in movement thereof longitudinally through the said bore of coupling 48. This mechanism can be provided with any suitable means for locking the vanes in adjusted position. A knob 58 is provided at the outer end of rod 46 to facilitate operation of the latter. Knob 58 can be removed after mechanism is adjusted, or it can be replaced by a key operator if desired.

From the above description it will be noted that the nozzle constituted by vanes 26 and 28 is adjustable to regulate the size of the nozzle opening and is also directionally adjustable in each adjusted size of the nozzle opening. The size of the outlet opening in the nozzle is readily varied by moving the vanes 26 and 28 toward and away from each other, and it will be understood that this is readily accomplished by rotating rod 46 thereby effecting longitudinal movement thereof. Thus, for example, by turning rod 46 clockwise viewing Fig. 6, said rod is moved longitudinally inwardly whereby vanes 26 and 28 are moved toward each other to various positions from the fully separate positions or uncovering positions of said vanes in which they lie adjacent said walls of casing 16 to the fully closed condition of the nozzle in which said vanes are positioned to cover said opening and so that their free edges or ends 36 and 38 are adjacent to or in engagement with each other, one of several intermediate positions of said vanes being shown in full lines in Fig. 4. In the position of the vanes 26 and 28 illustrated in full lines in Fig. 4, the flow of air occurs approximately in the form of a sheet disposed centrally between the upper and lower walls of casing 16. In the event, however, that the top of the cargo in the compartment of the hold is to be above the level at which the air flows through outlet 14 with the vanes adjusted as shown in full lines in Fig. 4, said vanes are moved to the position illustrated in full lines in Fig. 5 whereby to direct the flow of air upwardly over the top of the cargo. This is accomplished by pivotal movement of rod 46 in a counter-clockwise direction viewing Fig. 5, on the pivot provided by lateral extension 50 of the coupling in engagement with socket 52. It will be observed that rod 46 constitutes part of the means for moving the vanes toward each other and away from each other and also for moving said vanes in the same direction relative to each other to adjust the air-flow directing positions of said vanes.

As indicated above, the outlet device 14 of the present invention is provided with means at the outlet opening of casing 16 for directing the air flow in a direction transversely of the line of flow determined by the positions of vanes 26 and 28. The means provided for this purpose comprises a plurality of blades 60 which are individually pivotally connected at their opposite ends to the opposite walls of casing 16 in any suitable way as by means of headed pins 62. As illustrated in Fig. 9, vanes 60 can be variably positioned for directing the air flow laterally as may be required in accordance with the condition of the hold and the position of the outlet device therein. Several of these blades can be connected together for conjoint adjustment by means of a lateral connecting bar (not shown) or in any other suitable way.

In the form of the invention illustrated in Fig. 10 the outlet device 14A is of substantially the same construction as the above described outlet device 14 but as here shown there are two nozzles which control the flow of the air from the duct to the particular space or compartment of the hold, one nozzle being constituted by a pair of vanes 26A and 28A and the other nozzle being constituted by a pair of vanes 26A' and 28A', each pair of vanes having a companion operating rod 46. As shown, the vanes 26A and 28A are adjusted to direct the air upwardly while the vanes 26A' and 28A' are adjusted to direct the air downwardly, but it will be understood that the vanes of each pair can be adjusted so that both nozzles direct the air either upwardly or downwardly as may be desired, or vanes 26A and 28A can be adjusted to direct the air downwardly while vanes 26A' and 28A' can be adjusted to direct the air upwardly. It will be noted, however, that a feature of the provision of the outlet with the plurality of pairs of vanes is that the dimension of casing 16 between the front and rear ends thereof can be less than when one pair of vanes is provided. Further, it will be understood that in addition to the air-directional control provided by the pair of vanes 26 and 28 of outlet 14 illustrated in Figs. 4 to 8 the dimension of casing 16 between the front and rear ends thereof is less than would be the case if a single blade damper, for example, were used for controlling the size of the opening for the passage of air from duct 12 through the outlet device.

In the form of the invention illustrated in Fig. 11 the outlet device 14B is of the same construction as the outlet device 14A, but as here shown outlet device 14B is positioned horizontally so that the vanes 26B and 28B of one pair of vanes and 26B' and 28B' of the other pair of vanes are adjustable for directing the air flow laterally instead of up and down. In this form of the invention the vanes 60 are individually adjustable for directing the air as may be desired in a direction transversely of the direction of flow determined by the adjustment of vanes 26B, 28B and 26B', 28B'. Also, it will be understood that while the outlet device 14 of the present invention is mounted so that the vanes 26 and 28 are adjustable for directing the air upwardly and downwardly as may be required by the conditions in the hold, said outlet device can be mounted in such position that said vanes direct the air laterally instead of upwardly and downwardly in the event that such flow of air is required in any particular case.

Thus, it is seen that the outlet devices described above are well adapted to accomplish the several objects of the invention. It will be understood that said devices and the various parts thereof will be made of suitable metals having the desired properties. Thus, for example, the casing 16 is preferably made of steel sheets or may be made of galvanized iron or other metals. The rear angle flange 18 is provided with drilled holes for mounting the unit on the duct with provision for the installation of a packing strip or gasket between said flange and the adjacent wall of the duct where required. If desired, flange 18 can be welded to the air duct instead of being bolted thereto. Nozzle vanes 26 and 28 are preferably made of steel. Also, it will be understood that said outlet device or various parts thereof can be provided with a finish which resists corrosion and can be readily painted preferably after installation on the ship, as a further protection against corrosion. Said outlet devices can be made in several standard sizes to suit different conditions, the variation in size being obtained preferably by varying the length of the casing of the outlet device, all outlet devices of different sizes being preferably of the same height whereby to facilitate manufacture and to reduce the cost of dies.

The outlet ducts of the present invention can be connected to the ends of the air ducts or to the ends of branch ducts instead of being connected to the sides of said ducts as illustrated.

While I have shown and described the preferred embodiment of my invention it will be understood that the latter may be embodied otherwise than as herein shown or described and that in the illustrated embodiment certain changes in the details of construction and in the arrangement of parts may be made. Thus, for example, in lieu of the specific mechanism described above for operating the nozzle vanes other operating mechanisms may be used, and in this connection it will be noted that while the conjoint operation of the nozzle vanes is preferred, provision may be made in lieu thereof for adjusting the nozzle vanes separately to the desired positions for regulating the size of the nozzle and for directing the flow of air as desired. It will, of course, be clearly understood that the present invention is applicable to air heating and ventilating systems as well as to air conditioning systems proper. Therefore, wherever reference is made in the specification and claims to air conditioning systems, air heating and ventilating systems are included. Accordingly, as these and various other changes may be made in the outlet devices of the present invention, I do not wish to be limited to the construction herein shown or described except to the extent which may be required by the scope of the appended claims.

Having thus described my invention, what I claim and desire to secure by Letters Patent is:

1. An outlet for an air duct of an air conditioning system, comprising a casing having an inlet opening and an outlet opening, a nozzle comprising a pair of vanes for controlling said inlet opening and for directing air through said outlet, means mounting said vanes for pivotal movement, said vanes being movable on their respective pivots from positions in which they cover said opening to positions in which they uncover said opening and to a plurality of intermediate positions for regulating the size of said opening, each of said vanes extending radially from its pivot toward the companion vane and terminating in a free end spaced radially from said pivot, the free ends of said vanes being adjacent each other when the companion vanes are in said covering positions thereof, and being spaced from each other in said uncovering and intermediate positions of said vanes, means connected to said vanes between their pivots and their free ends for moving said vanes on said pivots for covering and uncovering said opening, and means for moving said vanes on their pivots in the same direction relative to each other to adjust the air-flow directing positions of said vanes when said vanes are in said uncovering and intermediate positions thereof.

2. An outlet for an air duct of an air conditioning system, comprising a casing having an inlet opening and an outlet opening, a nozzle comprising a pair of vanes for controlling said inlet opening and for directing air through said outlet, means mounting said vanes for pivotal movement, said vanes being movable on their respective pivots from positions in which they cover said opening to positions in which they uncover said opening and to a plurality of intermediate positions for regulating the size of said opening, each of said vanes extending radially from its pivot toward the companion vane and terminating in a free end spaced radially from said pivot, the free ends of said vanes being adjacent each other when the companion vanes are in said covering positions thereof, and being spaced from each other in said uncovering and intermediate positions of said vanes, means connected to said vanes between their pivots and their free ends for moving said vanes on said pivots for covering and uncovering said opening, and means forming a part of said last mentioned means for moving said vanes conjointly on their pivots in the same direction relative to each other to adjust the air-flow directing positions of said vanes when said vanes are in said uncovering and intermediate positions thereof.

3. An outlet for an air duct of an air conditioning system, comprising a casing having an inlet opening and an outlet opening, a nozzle comprising a plurality of vanes for controlling said inlet opening and for directing air through said outlet, said vanes being mounted for movement in said casing toward and away from each other for regulating the size of said inlet opening and movable in the same direction relative to each other for controlling the direction of the flow of air from said casing through said outlet opening, means for positively moving said vanes conjointly toward and away from each other for decreasing and increasing, respectively, the size of said inlet opening and for moving said vanes in the same direction relative to each other for controlling the direction of the flow of air out of said casing, said vane-moving means comprising a rod mounted for independent pivotal and longitudinal movements, respectively, and operatively connected to said vanes whereby longitudinal movements of said rod in opposite directions, respectively, result in movements of said vanes toward each other and away from each other, respectively, for controlling the size of said inlet opening, and whereby pivotal movement of said rod in opposite directions, respectively, effects said movement of said vanes for controlling the direction of air-flow through said inlet opening out of the casing.

4. In an air duct of an air conditioning system, said duct having an outlet for the passage of conditioned air therefrom, and a nozzle comprising a plurality of vanes mounted in said outlet for pivotal movement toward and away from each other to various relative positions to adjust the size of said passage, said vanes being also movable in the same direction relative to each other to various positions for controlling the direction of the air-flow through said passage in the adjusted size thereof, links pivotally connected to each other and to said vanes, respectively, and a rod pivotally connected to said links and pivoted also intermediate its ends at a point spaced from its pivotal connection to said links, said rod being also mounted for longitudinal movement thereof in two directions transversely of and through said intermediate pivot thereof, whereby longitudinal movement of said rod regulates the size of said passage and pivotal movement of said rod controls the direction of the air-flow through said passage.

5. An outlet for an air duct of an air conditioning system, comprising a casing having an inlet opening and an outlet opening and a passage therein between said openings, a pair of vanes pivotally mounted in said casing and positioned transversely of said passage, said vanes being movable toward and away from each other for closing and opening said inlet and for adjusting the size thereof, the vanes of said pair being also movable in the same direction to various positions for controlling the direction of the flow of air from the casing, and longitudinally movable means operatively connected to said vanes for conjointly pivotally moving the same toward and away from each other to control the size of the inlet, said longitudinally movable means being also pivotally movable and operatively connected to said vanes for conjointly moving said vanes to adjust the air-flow directing positions of said vanes to direct the air-flow in various directions.

EDWIN STERNBERG.